United States Patent [19]

Nisley

[11] Patent Number: 4,676,670
[45] Date of Patent: Jun. 30, 1987

[54] BEARING TAKE-UP FRAME

[75] Inventor: Donald L. Nisley, Greenville, S.C.

[73] Assignee: Reliance Electric Company, Greenville, S.C.

[21] Appl. No.: 833,019

[22] Filed: Feb. 26, 1986

Related U.S. Application Data

[63] Continuation of Ser. No. 600,579, Apr. 16, 1984, abandoned.

[51] Int. Cl.$^4$ .............................................. F16C 23/02
[52] U.S. Cl. ..................................... 384/247; 384/260
[58] Field of Search ............... 384/247, 249, 252, 253, 384/258, 259, 260, 428, 434, 436, 437

[56] References Cited

U.S. PATENT DOCUMENTS

| | | | |
|---|---|---|---|
| 2,791,474 | 5/1957 | Richard | 384/260 |
| 4,212,502 | 7/1980 | Ames et al. | 384/205 X |
| 4,325,588 | 4/1982 | Elliott, Jr. et al. | 384/247 |
| 4,433,878 | 2/1984 | Rosenthal | 384/434 |

Primary Examiner—Stuart S. Levy
Assistant Examiner—David Werner
Attorney, Agent, or Firm—Dority & Manning

[57] ABSTRACT

A bearing take-up frame including a base assembly having a top plate permanently, pivotally secured thereto at one end and removeably secured thereto at an opposite end. A bearing block assembly is received between the base assembly and the top plate for guided axial adjustment with respect thereto. End walls are secured to the base assembly and the top plate respectively, with a lower end wall defining a generally U-shaped slot. A threaded element is received in the U-shaped slot and held against axial movement, and has a transmission screw threadably received therethrough, an opposite end of which is secured to the bearing block. Rotation of the threaded element thus imparts movement to the bearing block. By releasing and pivoting the top wall upwardly, the bearing block, transmission screw and threaded element may be removed or installed.

10 Claims, 6 Drawing Figures

BEARING TAKE-UP FRAME

This is a continuation of application Ser. No. 600,579, filed Apr. 16, 1984 now abandoned.

BACKGROUND OF THE INVENTION

This invention relates to a take-up frame for a bearing which permits lateral entry or removal of a bearing block assembly therefrom, in a direction transverse to the longitudinal axis of the frame. The bearing block is axially adjustable with respect to the longitudinal axis of the frame and transverse to a shaft to be received in the bearing to compensate for stretching of a conveyor or drive belt or wearing of a chain driven by the shaft.

Take-up frames of a general type similar to the instant invention are known in the art, and the present frame represents improvement over same. Such known take-up frames include structures which incorporate a bearing block that is guideable along guide elements or the like, with movement being provided axial to the length of the take-up frame by a transmission screw arrangement. Such prior devices have included provision of the transmission screw generally along a center line through the bearing, extending in a direction transverse to the axis of a shaft to be journaled in the bearing as set forth in U.S. Pat. No. 4,212,502 to Ames et al. Likewise other prior art take-up frames provide an offset transmission screw, such as adjacent an upper end of the bearing block.

Generally, take-up frames of the prior art have assumed one of several configurations. For example, frames have been constructed of suitable structural elements, all of which are permanently united to define a housing within which the bearing block is received between oppositely located guide elements. In such particular arrangements, installation and removal of the bearing block, is achieved without any manipulation of the frame. Instead, at least one of the guide elements is lesser in length than the internal length dimension of the frame. The bearing block may then be removed or installed through an open side of the frame. With such arrangement, obviously the overall length of the frame must exceed the length of the guide by an amount at least equivalent to the length of guide slots on the bearing block. In another frame form, as described in the Ames et al U.S. Pat. No. 4,212,502, a top plate is bolted to the base of the frame, and is removed, for removal, or installation of the bearing block assembly through the open top of the frame.

With either of the arrangements set forth above, several problems exist. Particularly, it is necessary to totally remove the top plate of the Ames et al device which takes time and presents loose bolts, etc. that may become lost or misplaced. Further as to the Ames et al device, forces may be developed along the upper portion of the frame which would lead to misalignment of the end plates and thus the transmission screw, and/or failure of frame weldments. Similar problems exist with the other frames as pointed out above. Such problems of the prior art frames are, however, alleviated with the improved take-up frame of the present invention, and the novel differences of the instant take-up frame are neither taught nor suggested by any known prior art.

SUMMARY OF THE INVENTION

It is an object of the present invention to provide an improved bearing take-up frame.

Another object of the present invention is to provide an improved bearing take-up frame that permits ease of removal of the bearing block assembly therefrom while avoiding any likelihood of possible misalignment of the frame.

Yet another object of the present invention is to provide an improved bearing take-up frame that permits a maximum range of adjustment for the length of the take-up frame while affording ease of installation and removal of the bearing block assembly, and with improved overall frame strength.

Generally speaking, the improved bearing take-up frame according to the present invention comprises a base assembly, said base assembly comprising a base plate; a first pair of standards secured to said base plate adjacent one end of same and extending upwardly therefrom; a second pair of standards secured to said base plate adjacent an opposite end of same and extending upwardly therefrom; a lower end wall secured to said base plate between said second pair of standards, said lower end wall extending upwardly from said base plate by a distance less than the height of said standards and defining a generally U-shaped slot in an upper end of same; and a longitudinal guide element secured to said base plate and extending therealong; a top plate permanently secured to said first pair of standards for pivotal movement in a vertical plane thereabout, said top plate having an upper end wall secured to same adjacent an opposite end from said pivotal connection and extending inwardly therefrom, said upper end wall being receivable between said second pair of standards, an outer free end of said upper end wall being locateable adjacent said U-shaped slot; said top plate further having a guide element secured to an underside of same in alignment with said guide element on said base plate; a bearing block receivable between said base plate and said top plate for adjustable movement along said guide elements; a transmission screw secured to said bearing block and extending outwardly therefrom; and a threaded element received within said slot and held therein against axial movement, said screw being threadably received through said threaded element, whereby rotation of said threaded element will impart movement to said bearing block.

More specifically, the take-up frame according to the present invention, due to its unique construction, is capable of withstanding forces without adverse effect, the magnitude of which would be likely to distort take-up frames of the prior art. Particularly, the base of the present take-up frame, and elements secured thereto are securely integrated into a base assembly structure with appropriate weldments at all appropriate locations. With the lower end wall structure as described herein, the threaded element for the transmission screw is received within the elongated slot as opposed to prior art devices where the slot is defined by both the bottom end wall and a top end wall, and a gap preferably remains between the top and bottom end walls when the end walls are juxtaposed. Accordingly with the device of the present invention, the vast majority of force applied against the take-up frame is transmitted to the base as opposed to the pivotal top. Since of course the base is a stronger and more rigid structure, there is less likelihood of distortion and/or misalignment of the frame.

The top plate of the present take-up frame is preferably a channel member with the legs extending upwardly from the web, one end of which is received about a pivot pin that is permanently secured between the first pair of standards. An opposite end of the top plate is secureable by a bolt or the like that extends across the second pair of standards. As such, by removal of the single bolt from the second pair of standards, the top plate is released and capable of pivotal movement in a vertical plane about the first pair of standards. Such feature not only reduces the time required for installation or removal of the bearing block assembly, but also maintains all of the elements of same intact with the exception of the one bolt, leading to an improved overall structure.

DESCRIPTION OF THE PREFERRED EMBODIMENTS

Figure 1:
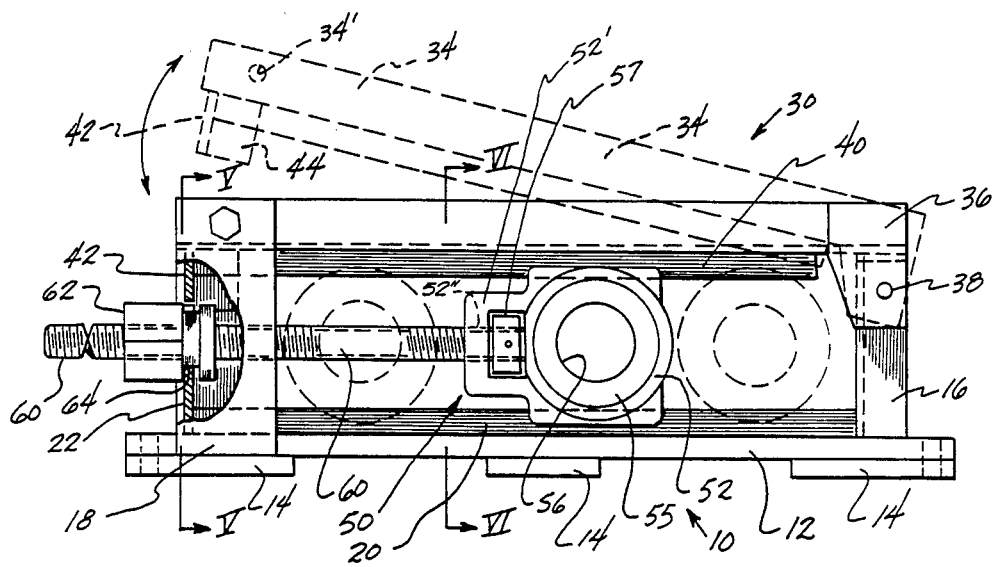
FIG. 1 is a side elevational view, partially cut away, of an improved bearing take-up frame according to teachings of the present invention.
Figure 2:
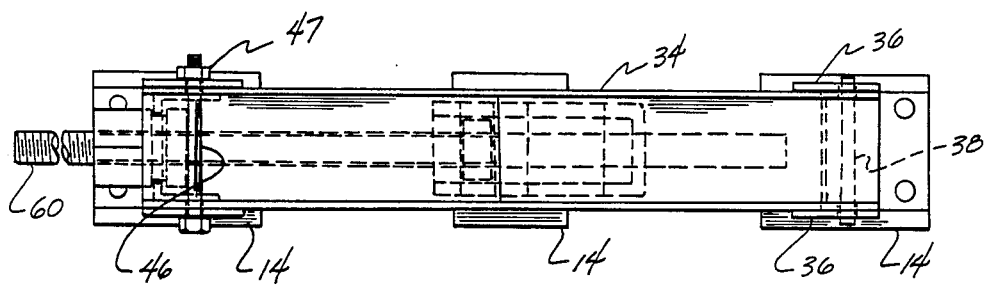
FIG. 2 is a top plan view of the take-up frame as illustrated in FIG. 1.
Figure 3:
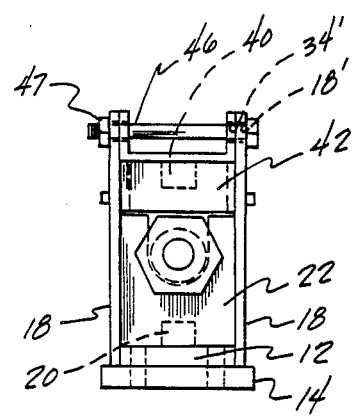
FIG. 3 is a left hand end view of the take-up frame as illustrated in FIG. 1.

Making reference to the Figures, preferred embodiments of the present invention will now be described in detail. As illustrated in FIG. 1, the bearing take-up frame comprises a base assembly generally indicated as 10 having a top plate assembly generally indicated as 30 pivotally secured thereto, and with a bearing block assembly generally indicated as 50 received therebetween for adjustable movement in a direction axial to the length of the take-up frame.

Figure 4:
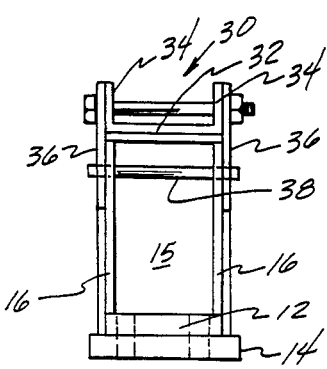
FIG. 4 is a right hand end view of a take-up frame as shown in FIG. 1.
Figure 5:
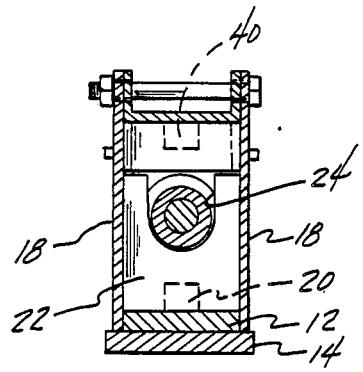
FIG. 5 is a vertical cross-sectional view of the take-up frame as shown in FIG. 1, taken along a line V—V.

Base assembly 10 includes a base plate 12 that has a plurality of support feet 14 secured therebeneath. A channel member 15 (see FIG. 4) is secured adjacent one end of base plate 12 and extends upwardly therefrom, with legs 16 extending outwardly from the web and defining the first pair of spaced apart standards. Preferably channel member 15 corresponds in width to base plate 12, and securement is preferably accomplished by weldments along all abutting surfaces. A second pair of standards 18 are secured to base plate 12 at an opposite end of same. Standards 18 are preferably welded to opposite sides of base plate 12 and to a foot support 14 located therebeneath and extend upwardly therefrom for a distance above plate 12 equal to channel member 15. A guide element 20 is secured to base plate 12 and extends along at least the operative length of same, the purpose of which will be described hereinafter. Located between the second pair of standards 18 is a lower end wall 22 which is secured as by weldments to base plate 12 and to inside surfaces of standards 18. Lower end wall 22 extends upwardly between standards 18, preferably extending more than half the height of same, and defines, a U-shaped slot 24 at an upper end thereof.

Top plate assembly generally indicated as 30 includes a channel member or plate 32 having opposite legs 34 extending upwardly from the web of same. Channel plate 32 has a pair of connector ears 36 secured along an outside portion of legs 34 at one end thereof and extending downwardly therefrom. Connector ears 36 are provided with openings alignable with openings through standards 16. A pivot pin 38 passes through the aligned openings in ears 36 and standards 16 and is permanently secured to connector ears 36, as by weldments to unify top plate assembly 30 and base assembly 10. In such fashion, top plate 32 may be moved in a vertical plane about standards 16 and pin 38 to provide access to the interior of the take-up frame. Top plate 32 is further provided with a guide element 40 secured to an underside of same that extends along at least the operative length of the take-up frame. Guide element 40 is vertically aligned with guide element 20 to receive a bearing block therebetween. Channel plate 32 is further provided with an upper end wall 42 that preferably is a channel member having legs 44 that extend inwardly from the web in a direction toward first standards 16. Top end wall 42 is positionally secured to an underside of top plate 32, such that, when top plate 32 is in a lowered position, an outer free end 43 of upper end wall 42 is aligned with bottom end wall 22 of base assembly 10 with legs 44 of same being located between standards 18. Outer free end 43 of end wall 42 preferably terminates just above lower end wall 22, leaving a slight gap therebetween. Standards 18 and legs 34 of channel 32 are provided with openings 18' and 34', respectively, which are aligned when top plate 30 is properly located with respect to base assembly 10 in a lowered position. A bolt 46 or the like may be passed through openings 18' and 34' and secured with a nut 47, such that, top plate assembly 30 is removeably secured in the lower position with respect to base assembly 10.

Figure 6:
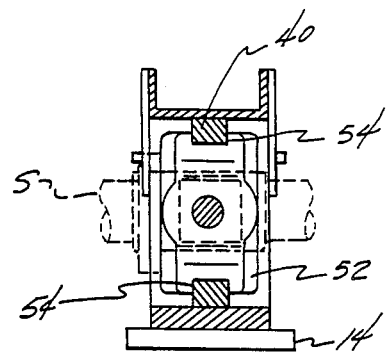
FIG. 6 is a vertical cross-sectional view of the take-up frame as illustrated in FIG. 1, taken along a line VI—VI.

Bearing block assembly generally indicated as 50 is provided within the confines of the take-up frame, and includes a bearing block 52 that is provided with appropriately sized slots 54 at the top and bottom of same which mate with guide elelments 20 and 40 for movement therealong. Bearing block 52 further includes a bearing 55 received therein that defines a shaft receiving opening 56 into which an appropriate shaft may be journaled for rotation (see FIG. 6). Bearing block 52 has a protrusion 52' extending axially therefrom. Protrusion 52' defines a threaded opening 52" in which a transmission screw 60 is received. A nut 57 is located within a portion of protrusion 52' to receive screw 60 and lock same to bearing block 52. Transmission screw 60 is thus secured at one end to threaded element 57 of bearing block 52 and extends axially outwardly therefrom, with an opposite end of same being in threaded engagement with a threaded element or nut 62. Nut 62 is provided with a small diameter medial portion 64, which is received within U-shaped slot 24 of bottom end wall 22. Axial movement of nut 62 is thus precluded by the larger diameter sections on opposite sides of portion 64. Rotation of nut 62 will therefore cause a corresponding axial movement of bearing block 52 along guide elements 20 and 40 to properly position same for compensation of worn or stretched work elements as discussed above.

With top plate assembly 30 secured in the down or lower position, bearing block 52 may be appropriately moved axially with respect to the take-up frame to achieve the intended adjustment. Should it become desirable to replace bearing block assembly 50, bolt 46 may be removed from within openings 18' and 34' of standards 18 and legs 34, after which top plate assembly 30 may be pivoted upwardly about pivot pin 38 as illustrated in phantom in FIG. 1. Bearing block assembly 50 may then be lifted from the take-up frame. Once a bearing block assembly 50 is replaced within the take-up frame in proper alignment with lower guide element 20, top plate assembly may then be pivoted downwardly. Top end wall 42 will then preferably reside above small diameter portion 64 of nut 62, and upper guide element 40 will fit into upper slot 54 of bearing block 52. Locking bolt 46 may be replaced through openings 18' and 34' to resecure top plate assembly 30 to base assembly 10 in the down, operative position.

Having described the present invention in detail, it is obvious that one skilled in the art will be able to make variations and modifications thereto without departing from the scope of the invention. Accordingly, the scope of the present invention should be determined only by the claims appended hereto.

That which is claimed is:

1. An improved bearing take-up frame comprising:
(a) a base assembly, said base assembly comprising a base plate; a first pair of standards secured to said base plate adjacent one end of same and extending upwardly therefrom, a second pair of standards secured to said base plate adjacent an opposite end of same and extending upwardly therefrom, a lower end wall secured to said base plate between said second pair of standards, said end wall extending upwardly from said base plate for a distance less than the height of said standards and defining a generally U-shaped slot in an upper end of same; and a longitudinal guide element secured to said base plate and extending therealong;
(b) a top plate permanently secured to said first pair of standards for pivotal movement in a vertical plane thereabout, said top plate having an upper end wall secured to same at an end opposite said pivotal connection, said upper end wall being receivable between said second pair of standards, said upper end wall being generally rectangular and an outer free end of same presenting a straight edge adjacent an upper end of said U-shaped slot in said bottom wall, said top plate further having a guide element secured to an underside of same in alignment with said guide element on said base plate,
(c) a bearing block receivable between said base plate and said top plate, and being adapted for adjustable movement along said guide elements,
(d) a transmission screw secured to said bearing block and extending outwardly therefrom, and
(e) a threaded element received within said elongated slot and below said straight edge, and being held therein against axial movement, said transmission screw being threadably received through said element, whereby rotation of said threaded element will impart movement to said bearing block.

2. A bearing take-up frame as defined in claim 1 wherein said first pair of standards is provided by a channel element having a web and two legs extending outwardly therefrom.

3. A bearing take-up frame as defined in claim 1 wherein said top plate has a pair of ears secured thereto, said ears residing about an upper end of said first pair of standards, and wherein a pivot pin passes through said ears and said standards and is permanently secured to said ears, said top plate being pivotal about said pin.

4. A bearing take-up frame as defined in claim 1 wherein said guide elements are generally rectangular in shape and said bearing block defines upper and lower slots which mate with said guide elements.

5. A bearing take-up frame as defined in claim 1 wherein said lower end wall extends more than half the distance between said base and said top plate, and wherein said threaded element is provided with a small diameter medial section, said small diameter section being received in said generally U-shaped slot.

6. A bearing take-up frame as defined in claim 1 wherein said bearing block has a bearing received therein, said bearing being adapted to receive a shaft therethrough in a direction transverse to the direction of adjustment of said bearing block.

7. A bearing take-up frame as defined in claim 1 wherein said top plate is a channel member having a web with legs extending upwardly therefrom, said legs being receivable between said second pair of standards and secureable thereto to removeably lock said top plate in a down, operative position.

8. A bearing take-up frame as defined in claim 1 wherein said baes assembly has a plurality of supports secured to an underside of same.

9. A bearing take-up frame as defined in claim 1 wherein said outer free end of said upper end wall termintes above said bottom wall, leaving a gap therebetween.

10. A bearing take-up frame comprising:
(a) a base assembly, said base assembly comprising a base plate having support elements secured to an underside of same; a channel member secured atop said base plate adjacent one end of same, said channel member including a web having legs at opposite outer edges of same, said legs extending outwardly from said web and defining a first pair of standards, said channel member extending upwardly from said base plate for a predetermined distance; a second pair of standards secured to opposite sides of said base plate and extending upwardly thereabove an amount equal to said first pair of standards; a lower end wall secured to said base plate and the insides of said second pair of standards, said lower end wall extending upwardly from said base plate for a distance more than half the height of said standards and defining a generally U-shaped slot in an upper end of same; and a guide rail secured to an upper surface of said base plate and extending therealong between said lower end plate and said first pair of standards;
(b) a top plate assembly permanently secured to said base assembly for pivotal movement in a vertical plane thereabout, said top plate assembly comprising a channel member having a web with outer leg portions extending upwardly therefrom, a pair of ears secured to said leg portions at one end thereof and extending downwardly therefrom, said ears residing about said first pair of standards, a pivot pin passing through said ears and said standards and being permanently secured to said ears; an upper end wall secured to an under side of said web adjacent an end of same opposite said ears, an outer free end of said upper wall defining a straight outer edge thereacross, said outer edge abutting said lower end wall when said top plate assembly is in a down position and closing said slot thereat, said top plate assembly being removeably secureable to said second pair of standards in said down position; and a guide rail secured to an underside of said web in vertical alignment with said guide rail on said base plate;

(c) a bearing block received betyween said guide rails and mateable therewith for adjustable movement therealong, said bearing block having a shaft receiving bearing located therein;

(d) a threaded element having a small diameter medial section received within said slot below said straight outer edge of said upper end wall and being held against axial movement thereat; and (e) a transmission screw secured to said bearing block and being threadably received by said threaded element, whereby rotation of said threaded element will impart movement of said bearing block along said guide rails.

* * * * *